United States Patent Office 3,533,916
Patented Oct. 13, 1970

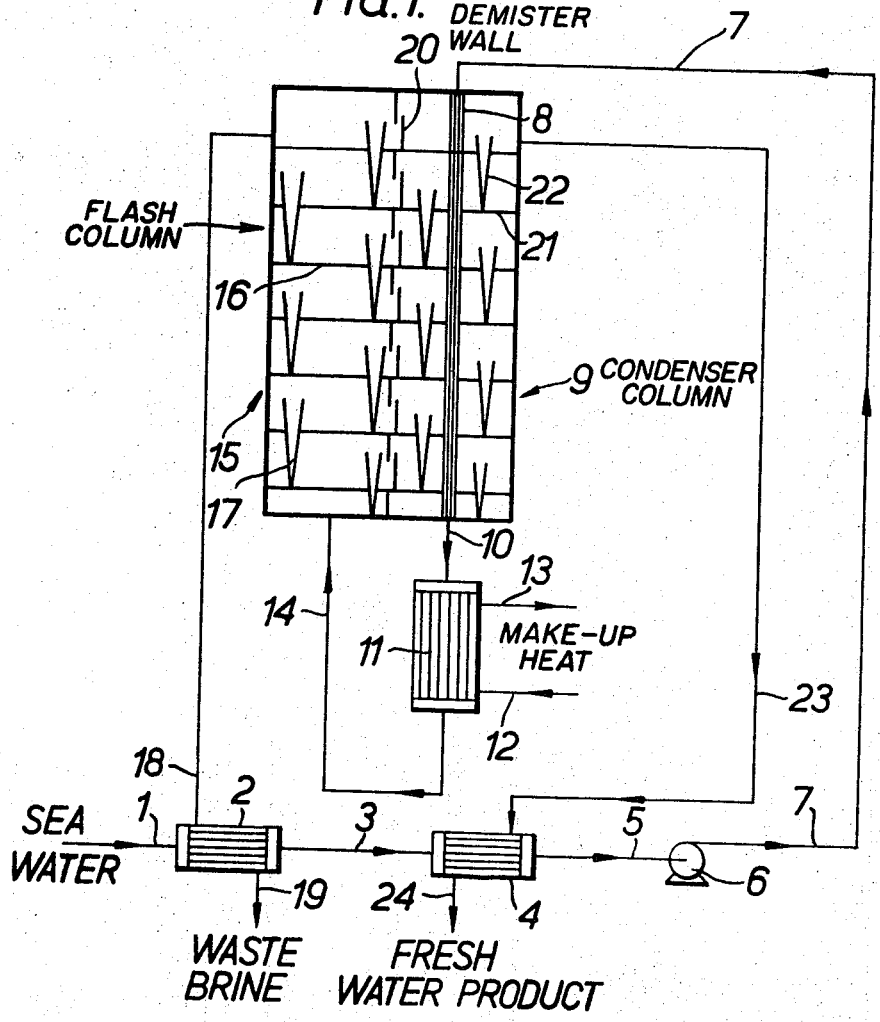

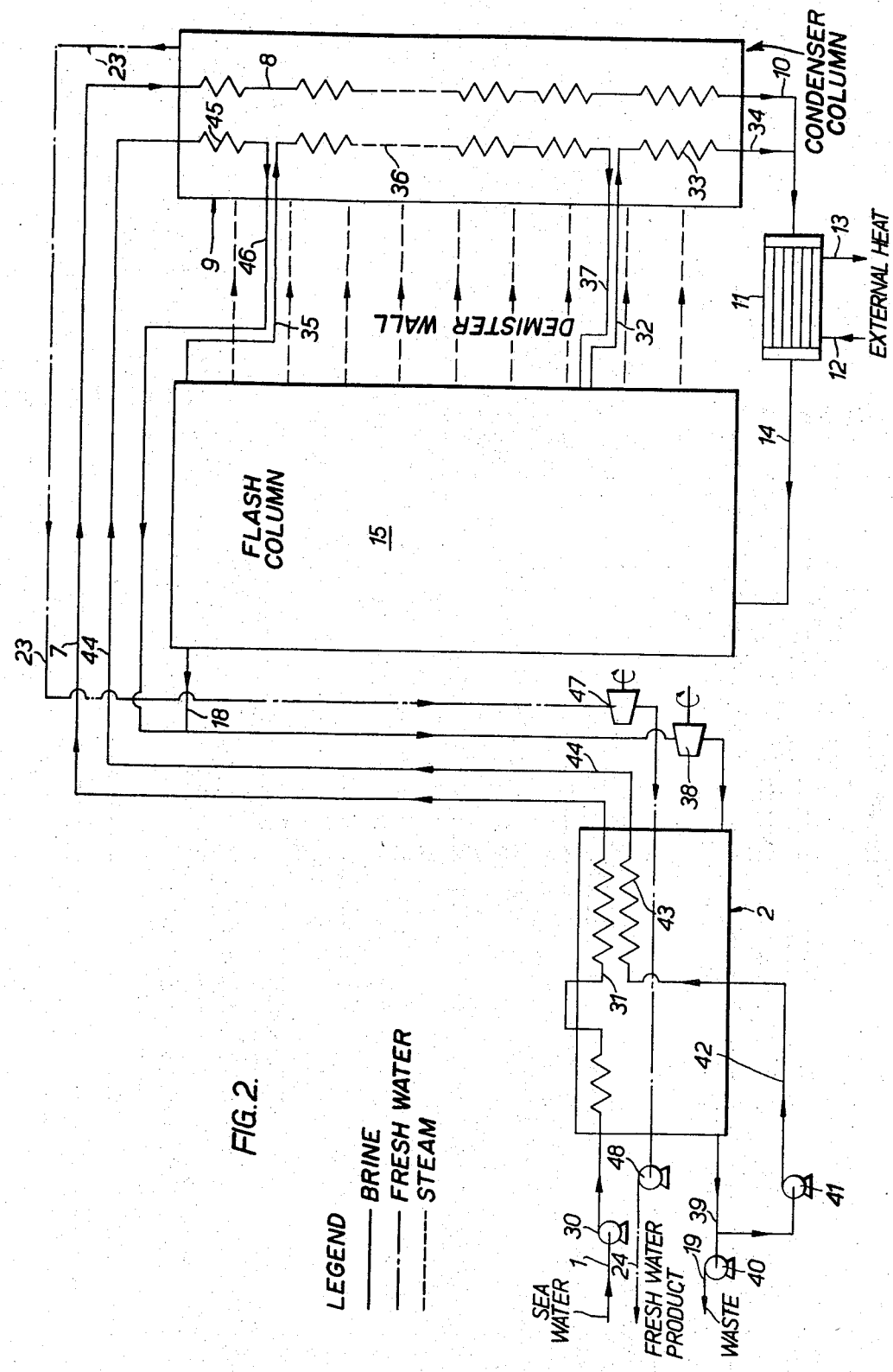

3,533,916
MULTISTAGE FLASH DISTILLATION APPARATUS WITH VERTICAL FLASH COLUMN
Ivan Henry Newson, Didcot, and Peter Thomas Walker, Reading, England, assignors to United Kingdom Atomic Energy Authority, London, England
Filed Aug. 14, 1968, Ser. No. 752,671
Int. Cl. B01d 3/06; C02b 1/06
U.S. Cl. 202—173  4 Claims

ABSTRACT OF THE DISCLOSURE

In a flash distillation apparatus for desalination and of the type in which steam is generated in a plurality of stages at different pressures and temperatures, a condenser in the form of a tower divided into sections by horizontal plates, the steam from the said stages being fed to an appropriate section of the condenser tower. The condenser tower also contains cooling means and risers pass through the plates to connect adjacent sections together, whereby the condensate flash boils in the risers and can be withdrawn from the top tower section.

The present inveniton relates to desalination processes and apparatus.

It will be known that flash distillation is one practical method of effecting desalination of sea water in order, for example, to provide fresh water of drinking quality or suitable for agricultural use. In a conventional multistage flash distillation plant, the heated brine is caused to flow through a series of flashing chambers in each of which a proportion of the brine is converted into steam and is then condensed within the chamber in order to provide the fresh water. In such a conventional plant, for example that currently operating at Kuwait, this condensation is affected upon condenser tubes and it can be shown from theoretical considerations that the temperature drop across these tubes must inevitably result in a loss of efficiency.

It will be apparent that the cost of fresh water produced in a desalination plant depends upon the initial cost of the plant and the efficiency with which it is operated.

It is an object of the present invention to provide a new or improved desalination process and apparatus.

According to the present invention a desalination process comprises heating brine, passing the same into the lower portion of a column divided into sections by horizontal plates with risers passing therethrough, when a mixture of steam and brine is formed in the sections of such column, withdrawing concentrated brine from the upper part of such column, passing the steam from each section of the column to a condenser column provided with horizontal plates, risers and condenser tubes in such a way that the steam condenses in the condensers column and flash boils in passing through the risers therein, thereby to rise from section to section, and withdrawing fresh water from the upper portion of such condenser column.

Thus according to a further aspect of the present invention, there is provided in or for a multistage flash distillation apparatus wherein steam is generated in a plurality of stages defined by different temperature and pressure conditions, a condenser comprising a tower divided into a plurality of sections by horizontal plates, cooling means extending through a plurality of said tower sections, risers passing through said plates to connect adjacent tower sections together, and means to withdraw condensate from the top tower section.

It will be appreciated that in essence the condenser column of the distillation apparatus is of essentially the same construction as the flash tower but is provided in addition with condenser tubes through which passes a cooling liquid. In this way, steam from each section of the flash column can be passed to the appropriate section of the condenser column and condensed therein; the heat energy in the steam is in part removed by heat exchange with the condenser tubes and in part transformed into work to lift the fresh water up the condenser column. The energy in the water at the top of the column can be recovered by the use of turbines or the like.

As is usual in the art, other heat exchange and energy recovery stages can be provided and it is very convenient to pass the brine rejected from the top of the flash column into a conventional horizontal flash distillation apparatus operating at a lower temperature, whereby further fresh water is obtained.

In order that the present invention may more readily be understood, one embodiment of the same will now be described by way of example and with reference to the drawings accompanying the provisional specification wherein:

FIG. 1 is a simplified flow sheet, and

FIG. 2 is a rather more detailed flow sheet.

Referring firstly to FIG. 1, fresh brine in the form of sea water is admitted by a pipe 1 and passes through a heat exchanger 2 which is used to exemplify a heat or energy recovery stage. The brine then passes by a pipe 3 to a further heat exchanger 4 and thence by pipe 5 to a pump 6. The brine leaves the pump 6 by a pipe 7 which passes it to a vertical bank of condenser tubes 8 located in a vertical condenser column 9. The heated brine leaves the condenser column 9 by means of a pipe 10 and passes to a further heat exchanger 11 where make-up heat is added by means of inlet and outlet pipes 12 and 13 respectively. The hot brine now leaves the heat exchanger 11 by means of a pipe 14 and passes into the base of a vertical flash column 15.

In this vertical flash column 15 the pressure is highest at the bottom and lowest at the top, and the column is divided into a plurality of sections or stages by means of horizontal plates 16, through which pass risers 17. The brine on passing up the risers 17 from stage to stage flashes and generates a quantity of steam. The brine from the top stage of the column is withdrawn by a pipe 18 and passes to the heat exchanger 2 from whence it is discharged as waste brine via the pipe 19.

The flash column 15 is divided from the condenser column 9 by means of a perforated wall 20 which is designed to permit the steam to pass from the flash column 15 to the condenser column 9 but to prevent brine from passing with the steam.

The condenser column 9 is also divided in a plurality of sections or stages by horizontal plates 21 through which pass risers 22 generally similar to the risers 17 but of smaller diameter since there is a smaller flow through the condenser column 9. Since the amount of water in the column 9 is relatively small, it may be convenient to provide wells in plates 21 to receive the bottoms of the risers 22. It will be apparent that the steam, passing through the wall 20, is condensed by the condenser tubes 8, but since there is a pressure and temperature differential between the top and the bottom of the condenser column 9, the condensed steam (which is the fresh water product) also flashes up the column to reach the top stage. The fresh water product is withdrawn from this top stage by a pipe 23 and is passed to the heat exchanger 4 from which it is discharged by a pipe 24 to storage.

FIG. 2 shows the same parts but in rather more detail, the plates and risers being omitted from the columns 9 and 15 for clarity. In the construction of FIG. 2, the sea water enters by a pipe 1 and is passed by a pump 30 to the heat recovery stage 2. In this case, the heat recovery stage is a conventional horizontal flash distillation apparatus, and the brine flows in the condenser tubes 31 of this flash distillation apparatus. The brine is then taken by the pipe 7 to the vertical condenser tubes 8 of the main condenser column 9, and as previously described, is passed from thence to the main flash column 15. This flash column is divided into two sections and a part of the brine reaching the upper stage of the lower section is taken by a pipe 32 to a second bank of condenser tubes 33 occupying the lower portion of the condenser column 9 the remainder passing to the lower stage of the upper section. The brine from these condenser tubes 33 flows by a pipe 34 into the pipe 10. A part of the brine reaching the top of the top section of the flash column 15 is taken by a pipe 35 to a third bank of condenser tubes 36 occupying the middle portion of the condenser column 9 and the brine flowing through these tubes is returned to the top stage of the lower portion of the flash column 15 by a pipe 37.

The remainder of the brine leaves the top of the flash column 15 by pipe 18 and is passed through a turbine 38 to the conventional horizontal flash distillation unit 2. The unused brine leaves this horizontal unit through a pipe 39 and a portion is passed to waste through the pipe 19 and a pump 40. A portion is re-circulated by a pump 41 through a pipe 42 to condenser tubes 43 located in the hotter part of the horizontal flash distillation unit 2. The brine leaving the condenser tubes 43 is passed by a pipe 44 to a fourth bank of condenser tubes 45 occupying the upper portion of the condenser column 9 and the brine leaves these tubes 45 by a pipe 46 which joins the pipe 18.

Energy is also extracted from the fresh water withdrawn from the top of the condenser column 9 by the pipe 23 by passing it through a turbine 47. This fresh water also flows through the horizontal flash distillation unit 2 and is discharged through the pipe 24 by means of a pump 48. A large proportion of the energy required in the circulating pumps 30, 40, 41 and 48 can be derived from the turbines 38 and 47.

We claim:

1. In a multistage flash distillation apparatus wherein steam is generated in a vertical flash column having a plurality of stages defined by different temperature and pressure conditions, the pressure being highest at the bottom stage and lowest at the top stage, a condenser comprising:

a tower divided into a plurality of sections by horizontal plates;

means comprising a perforated wall separating each section of the condenser from an associated steam generating stage of said flash column to supply steam to each of said sections from said associated stage, said wall permitting steam to pass therethrough to the condenser section while preventing the passage of liquid therethrough;

means to maintain each such section at a pressure below that of the section below;

cooling tube means extending through a plurality of said tower sections to convert the steam in each stage to condensate;

risers in said plates for the upward flow of flash boiling condensate passing through said plates to connect adjacent tower sections together; and means to withdraw condensate from the top tower section of said condenser.

2. The condenser of claim 1, wherein each of said plates has a well to receive the bottom of the riser.

3. The condenser of claim 1, wherein said cooling means comprises a plurality of banks of condenser tubes.

4. The condenser of claim 3, wherein one such bank of condenser tubes is fed with brine which is subsequently passed to the base of the flash distillation apparatus for distillation therein.

References Cited

UNITED STATES PATENTS

| | | | |
|---|---|---|---|
| 3,192,131 | 6/1965 | Loebel et al. | 202—173 |
| 3,219,552 | 11/1965 | Starmer et al. | 203—11 X |
| 3,249,517 | 5/1966 | Lockman | 202—173 X |
| 3,288,686 | 11/1966 | Othmer | 203—11 |
| 3,312,601 | 4/1967 | Wilson et al. | 203—11 |
| 3,342,697 | 9/1967 | Hammond | 202—173 |
| 3,344,041 | 9/1967 | Wulfson | 203—11 |
| 3,405,058 | 10/1968 | Miller | 203—11 X |

NORMAN YUDKOFF, Primary Examiner

F. E. DRUMMOND, Assistant Examiner

U.S. Cl. X.R.

202—185; 203—88